United States Patent [19]
Kern

[11] 3,831,457
[45] Aug. 27, 1974

[54] VARIABLE TRACKING CAM FOLLOWER

[75] Inventor: Richard A. Kern, Centerline, Mich.

[73] Assignee: General Motors Corporation, Detroit, Mich.

[22] Filed: Mar. 5, 1973

[21] Appl. No.: 338,369

[52] U.S. Cl................................. 74/569, 123/90.5
[51] Int. Cl........................................... F16h 21/14
[58] Field of Search...................... 74/569; 123/90.5

[56] References Cited
UNITED STATES PATENTS

| | | | |
|---|---|---|---|
| 1,847,312 | 3/1932 | Seufert | 74/569 |
| 2,451,395 | 10/1948 | Klukan | 74/569 |
| 2,642,051 | 6/1953 | Russell | 74/569 |
| 2,694,389 | 11/1954 | Turkish | 74/569 |

FOREIGN PATENTS OR APPLICATIONS

| | | | |
|---|---|---|---|
| 238,672 | 8/1925 | Great Britain | 74/569 |

*Primary Examiner*—Manuel A. Antonakas
*Assistant Examiner*—Daniel J. O'Connor
*Attorney, Agent, or Firm*—Arthur N. Krein

[57] ABSTRACT

A cam follower in the form of a roller has an outer peripheral contact surface of varying width to effect variable roller edge contact on the surface of a cam with which it is in rolling engagement.

6 Claims, 6 Drawing Figures

PATENTED AUG 27 1974        3,831,457

3,831,457

VARIABLE TRACKING CAM FOLLOWER

This invention relates to internal combustion engines and, in particular, to a cam follower for use in a cam and follower mechanism for operating valves, fuel injection devices and similar elements in such engines.

In the prior art of cam and follower mechanisms wherein the follower is in the form of a follower roller, both the cam and the roller have each been of the same width over their whole circumferential periphery. In most cases, the cams are normally formed integrally on the camshaft, and in order to eliminate problems of axial alignment of the followers on the cams, it has been normal procedure to use rollers of narrower width than that of the cams. These cam and follower mechanisms, as just described, are being used with satisfactory results in engines. However, after extended operation of these engines, wear of the cams on the camshaft does occur, especially on diesel engines where the cam and follower mechanisms are subject to relatively high load, as when used to operate fuel injectors. Observations made on the thus worn camshafts show that in most instances cam wear initiates at the outer edge of the follower roller path on the cam. Wear then progresses from the point of initiation across the lobe of the cam until the full width of the roller path engagement on the cam surface is encompassed.

It is therefore the primary object of this invention to provide a cam and follower mechanism having a variable tracking cam follower for use with a cam of uniform width whereby the edge contacts of the follower roller with the cam varies during each rotative cycle of the cam.

Another object of this invention is to provide a cam follower roller having undulating edges on its contact surface whereby the cam follower roller is variable tracking with respect to the cam on which it rotates.

Another object of this invention is to provide a cam and follower mechanism wherein the roller of the follower is provided with a non-uniform width cam contact surface so that the number of times the edges of the roller traverses over given points on the cam is reduced.

These and other objects of the invention are attained in a cam and follower mechanism by means of a non-uniform contact width roller cooperating with a cam, the width of the cam being greater than the maximum width of the roller so as to protract the time of formation of edge wear on the cam surface by the cam follower roller.

For a better understanding of the invention, as well as other objects and further features thereof, reference is had to the following detailed description of the invention to be read in connection with the accompanying drawings, wherein.

Figure 1:
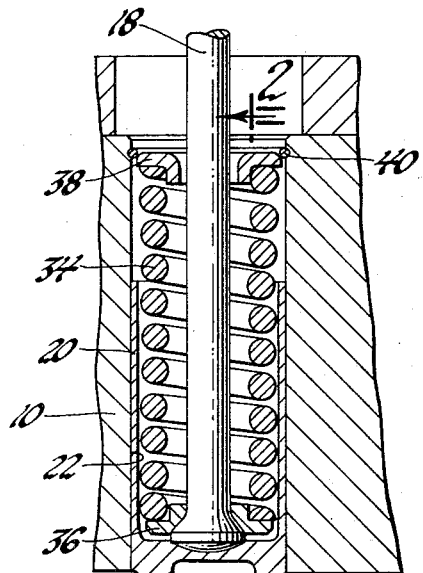
FIG. 1 is an elevational sectional view of a portion of an internal combustion engine having a cam and follower mechanism in accordance with the invention associated therewith for operating, as an example, a fuel pump.

Referring to FIG. 1, reference numeral 10 indicates the cylinder head of an internal combustion engine, for example, a diesel engine, having a camshaft 12 suitably journalled therein in a conventional manner. The camshaft 12 has a cam 14 thereon having a straight follower lifting cam surface 14a used to effect reciprocal movement of a valve, fuel injection device or similar element associated with the engine through a roller follower mechanism 16. The roller follower mechanism 16 includes the push rod 18, the lower end of which abuts and sockets in the end wall of a cup-shaped follower member 20 which is slidably received in the bore 22 in the cylinder head 10.

The lower end of the cup-shaped follower member 20 terminates in a pair of spaced apart depending arms 24 and 26 which support the opposite ends of a roller shaft 28 in suitable apertures provided for this purpose in these arms. A cam follower roller 30, to be described in detail hereinafter, is rotatably journalled on the shaft 28 by means of a bushing 32 and is guided endwise thereof by the innerfaces of the arms 24 and 26.

The follower roller 30 is continuously biased into rolling contact with the cam surface 14a of cam 14 by means of a spring 34 positioned in the bore 22 of the cylinder block 10 to encircle the push rod 18, one end of the spring abutting against a lower spring seat 36 engaging the lower socket end of the push rod 18 and the other end of the spring abutting against its upper spring seat 38 retained axially in one direction within the bore 22 by means of a spring retainer ring 40 positioned within a suitable annular groove formed in the cylinder head for this purpose.

Referring now to the subject matter of this invention, the follower roller 30 is of a nominal width, as desired, for rotation between the legs of the follower member 20 and its outer peripheral edges are machined or otherwise contoured so that the edges of the outer peripheral contact surface of this roller do not define straight annular contact lines on the cam surface 14a when the follower roller 30 is being rotated. In other words, the edges of contact surface of the follower roller should not be uniformly parallel to the sides of the roller.

Thus, the cam follower roller 30, constituted as a body of revolution about an axis, has an annular outer peripheral cam contact surface 42 and opposite flat sides 44 with non-uniform chamfered surfaces 46 therebetween. The juncture between the chamfered surfaces 46 and the surface 42 defining the edges 48a and 48b which in turn define the cam contact width of the surface 42 at any given line contact position between the follower roller 30 and the cam surface 14a.

Figure 2:
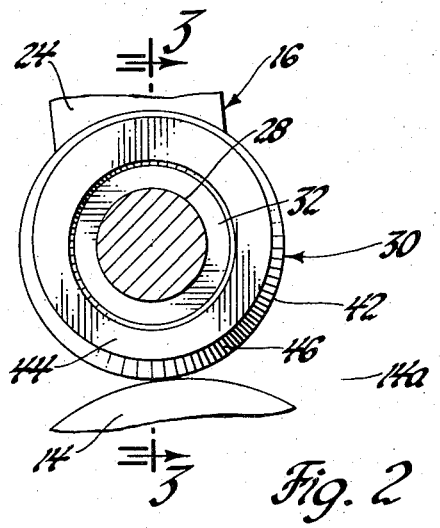
FIG. 2 is an end view of the follower roller of FIG. 1 taken along line 2—2 of FIG. 1.
Figure 3:
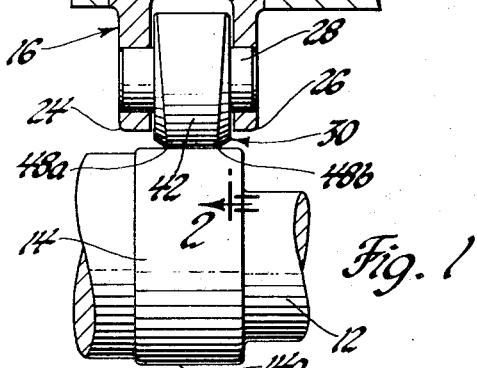
FIG. 3 is a sectional view of the follower roller of FIG. 1 taken along line 3—3 of FIG. 2.
Figure 3:
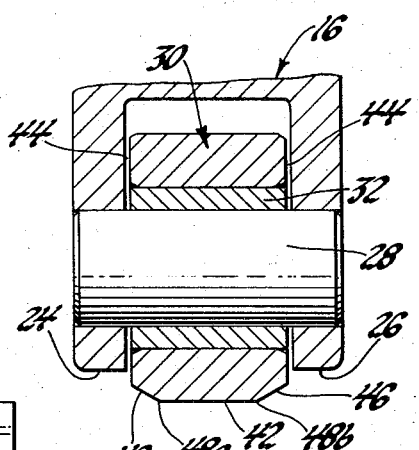

In the preferred embodiment of the follower roller 30, shown in FIGS. 1, 2 and 3, the outer peripheral or cam contacting surface 42 of the follower roller is divided into two portions of varying width joined at one end with each other at a position on the outer periphery of minimum width between the edges 48a and 48b of this surface and at the opposite end at a position on the outer periphery of maximum width between edges 48a and 48b, a position opposite to the position of minimum width between edges. The minimum width and maximum width between the contact edges of the follower roller are chosen as desired with due consideration to the pressure loading between the follower roller and the cam for a given application in an engine.

Figure 4:
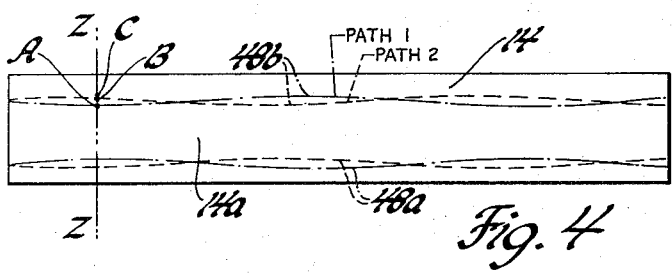
FIG. 4 is a flat pattern view of the cam lobe showing two paths traced by the variable tracking follower roller of FIG. 1.

By forming undulating edges 48a and 48b on opposite sides of the peripheral surface of the follower roller, it is possible to retard cam wear by protracting the time of formation of edge wear on the surface of the cam. This is accomplished by reducing the number of times the edges 48a and 48b of the follower roller traverses over a given point on the cam surface of the cam. This is clearly shown in FIG. 4 wherein the point A on the path 1 represents the point that one edge 48b of the follower roller 30 will hit on a plane Z—Z on the first revolution of the cam 14 on camshaft 12. Point B represents the point that the same edge 48b of the follower roller will hit on plane Z—Z on the second revolution of the camshaft 12. It can then be seen that on successive revolutions of the camshaft that a point where the same edge 48b of the follower roller contacts the cam surface 14a of the cam will vary along the line formed by points A and C on the plane line Z—Z. As can be seen in this figure, the circumferential length of the follower roller is less than the circumferential length of the cam 14.

From the above description, it will now become apparent that the follower roller 30 can be provided with any suitable configuration to provide for scalloped or undulated edges, and these can take the form of a continuous series of angular projections forming the border or edges 48a and 48b on opposite sides of the cam engaging surface of the follower roller, as shown, for example, in FIGS. 1, 2 and 3, or a continuous series of circle segments to form the border or edges on opposite sides of the cam engaging surface of the follower roller.

Figure 5:
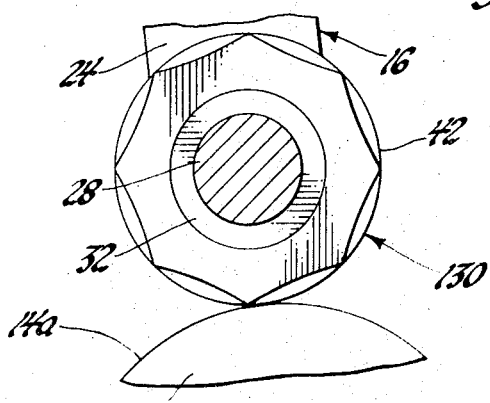
FIG. 5 is a view similar to FIG. 2 of an alternate embodiment of a variable tracking cam follower roller; and, FIG. 6 is an elevational view of the cam follower of FIG. 5.
Figure 6:
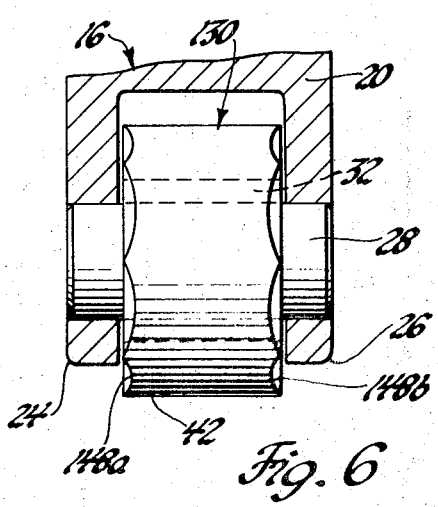

Thus, for example, in the alternate embodiment of the follower roller 130 shown in FIGS. 5 and 6, the edges 148a and 148b of this follower roller are formed as a continuous series of circle segments to, in effect, provide what may be referred to as scalloped edges on the follower roller, the width of the contact surface 42 of this roller thus varying as a function of the varying width between these edges.

From the description of the two embodiments of the edge patterns shown for the follower roller, it is apparent that any suitable undulating edge pattern can be used on these rollers. However, it is to be realized that, preferably, the number of repetitions of the edge pattern on a given diameter roller should be limited to limit the number of times the edges of the rollers will traverse over given points on the surface of the cam.

What is claimed is:

1. In a cam and follower mechanism, a rotary cam having a straight follower lifting cam surface, a reciprocally guided follower, and a variable tracking cam follower roller rotatably supported by said follower for engagement with said cam surface on said cam, said variable tracking cam follower roller having undulating edges defining the opposite side edges of the outer peripheral surface of said follower roller engaging said cam surface.

2. In a cam and follower mechanism according to claim 1 wherein the undulating edges of said variable tracking cam follower are in the form of a continuous series of angular projections relative to the sides of said variable tracking cam follower.

3. In a cam and follower mechanism according to claim 1 wherein said undulating edges of said variable tracking cam follower roller are in the form of a continuous series of circle segments.

4. A cam follower roller for use with a rotating cam in a cam and follower mechanism of the type in which the rotating cam has a straight follower lifting cam surface and a follower is reciprocally guided and rotatably supports a cam follower roller for rolling engagement with the cam surface of the rotary cam, said cam follower roller having parallel sides and an outer peripheral cam engaging surface with the edges of said cam engaging surface being non-parallel to the sides of said roller whereby said peripheral cam engaging surface is of varying width to effect variable roller edge contact on the cam surface of the rotating cam with which it is in rolling contact.

5. A cam follower roller according to claim 4 wherein said edges of said cam engaging surface are each in the form of a continuous series of angular projections relative to said sides of said cam follower roller.

6. A cam follower roller according to claim 4 wherein said edges of said cam engaging surface are each in the form of a continuous series of circle segments.

* * * * *